Aug. 3, 1954 C. ORLANDO 2,685,619

COUPLING CIRCUIT

Filed March 31, 1950

INVENTOR.
CARL ORLANDO
BY *Harry M. Saragovitz*
*Attorney*

Patented Aug. 3, 1954 2,685,619

UNITED STATES PATENT OFFICE 2,685,619

COUPLING CIRCUIT

Carl Orlando, Long Branch, N. J.

Application March 31, 1950, Serial No. 153,261

6 Claims. (Cl. 179—171)

Figures 1, 2:
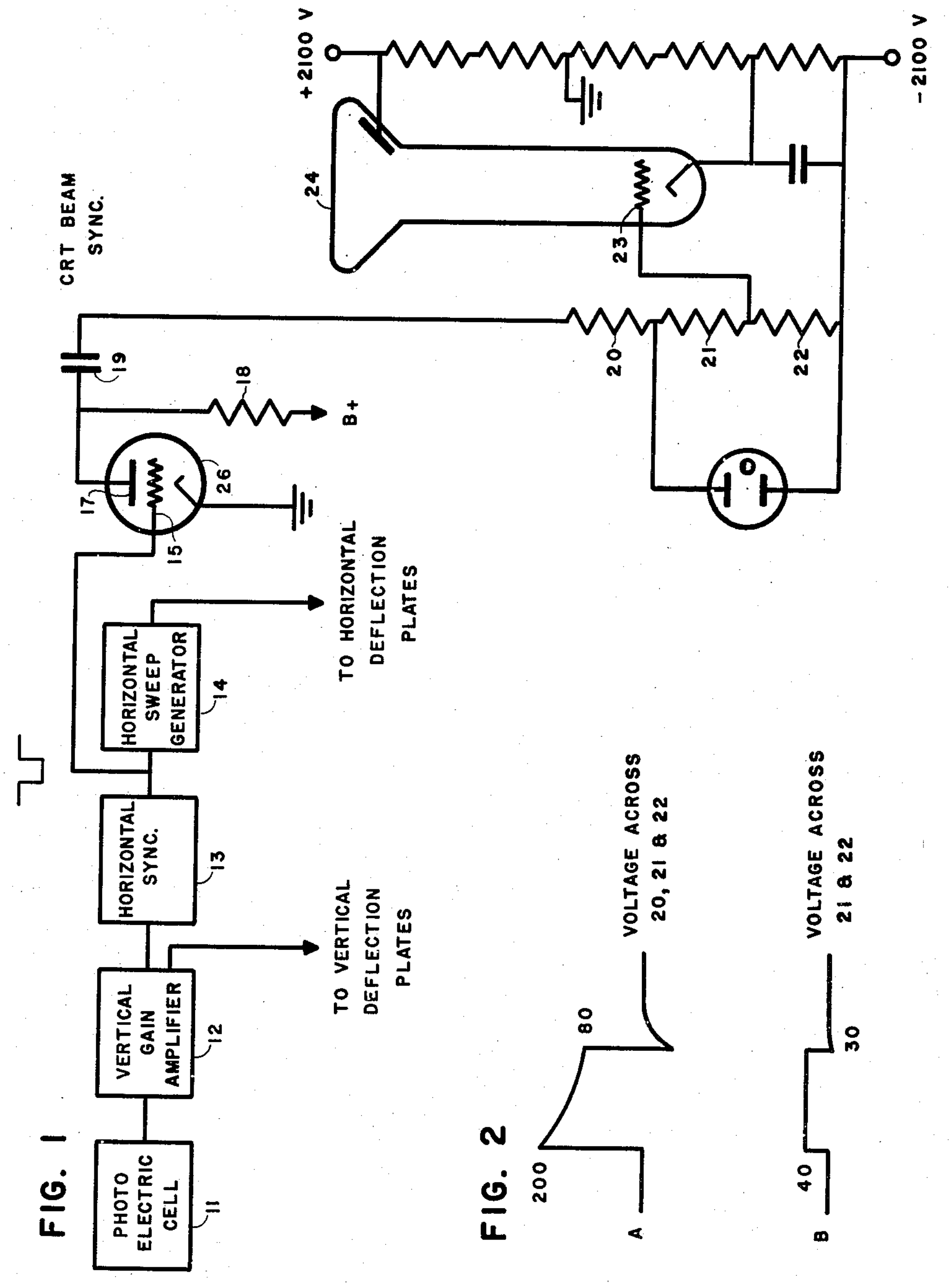

(Granted under Title 35, U. S. Code (1952), sec. 266)

The invention described herein may be manufactured and used by or for the Government for governmental purposes, without the payment of any royalty thereon.

This invention relates to coupling circuits and particularly to broad band rectangular pulse coupling circuits intended for use in the beam intensifying circuit of a cathode ray tube oscillograph.

Coupling circuits of various types have been known and used in the prior art, however, each of the prior circuits has disadvantages. For instance, where it is desired to couple pulses or signals of very low frequency, D. C. amplifiers have been used. However, as is well known, they are difficult to build and do not provide the necessary isolation between circuits which are at different levels of potential. A transformer coupling, although it provides the necessary isolation, is bulky, expensive and will not operate satisfactorily where it is desired to couple signals of low frequency or wide band width. Consequently, it is generally found advisable to use resistance-capacitance coupling circuits. For adequate coupling, it is necessary that the "time constant" of the coupling circuit be at least ten times as long as the duration of the longest pulse to be translated. The time constant of a resistance-capacitance circuit is the product in seconds of the capacitance in farads and the resistance in ohms. While it might thus be possible to build circuits having the necessary long time constants by either increasing the capacitance or the resistance, it has been found unsatisfactory to do this either because the capacitor becomes extremely large and expensive (particularly where high insulation is required) or the resistance so great as to affect the performance of the tube in the input of which it is connected.

It is therefore an object of this invention to provide a wide band pulse coupling circuit which is cheap and employs components of reasonable size.

It is still a further object of this invention to provide a pulse coupling circuit, the output of which will be a substantially rectangular pulse of constant amplitude regardless of the variation of amplitude of the input pulse so long as it does not fall below a minimum value.

In accordance with the invention, a wide band coupling circuit is provided for translating rectangular voltage pulses comprising a capacitor and resistor series combination and a voltage regulator shunting a portion of the resistor. This resistor and capacitor combination has a time constant value of the order of the duration of the longest pulse to be translated. The value of the portion of the resistance shunted by the voltage regulator is such that in the absence of the regulator the voltage across the portion during the pulse would always exceed the regulated voltage.

For a better understanding of the invention, together with other and further objects thereof, reference is had to the following description taken in connection with the accompanying drawings, and its scope will be pointed out in the appended claims.

In the drawings:

Fig. 1 is a circuit diagram partially schematic of an electronic shutter tester including the present invention; and Fig. 2 is a group of curves showing the relationship between the input and output voltages of the coupling circuit.

Referring now in particular to Fig. 1 of the drawings, there is disclosed a preferred embodiment of the invention in conjunction with an electronic shutter tester including a photoelectric cell 11 which is adapted to be energized by the light transmitted through the shutter to be tested. The output of the photoelectric cell is sent to the vertical gain amplifier 12. Its output is applied to the vertical deflection plates of cathode ray tube 24 and is also used to synchronize the horizontal sweep generator 14 through the horizontal synchronizing amplifier 13. The output of the horizontal synchronizing amplifier is also used to control the cathode ray beam synchronizing tube 26, the output of which is connected to the coupling circuit of this invention. The elements and circuits of all the components indicated in block diagram are conventional and well known in the art. The output of beam intensifier tube 26 is a positive pulse which is coupled through condenser 19 and resistors 20, 21 and 22 to the intensity grid 23 of cathode ray tube 24.

The operation of the system in accordance with the present invention may best be explained by reference to the curves of Fig. 2. In these curves, curve A represents the voltage between the top of resistor 20 and the cathode to tube 24 and curve B represents the voltage from the top of resistor 22 to the cathode of tube 24. Since it is required in the apparatus here described (and in many other applications) that the cathode ray tube beam be turned on only during the time when a voltage is applied to the vertical deflection plates, which time may vary from a small fraction of a second to several seconds, it is necessary that a suitable pulse of voltage be applied to the intensity grid to make it less negative with respect to the cathode than in the quiescent state. A negative pulse is applied to the grid 15 of beam synchronizer tube 26 so that the voltage on the plate 17 will be a positive pulse.

To briefly explain the operation of the coupling circuit, it should be pointed out that these circuits operate through the charge and discharge of the coupling capacitor. Thus when tube 26 has no signal on the grid, the plate of the tube is at some potential less than B+. During that time capacitor 19 is charged to a voltage equal to the potential difference between plate 17 and −2000 volts. When a negative pulse is applied to the grid of tube 26 causing it to conduct less, the plate potential rises carrying one side of capacitor 19 to the same potential. The only way in which the potential across the capacitor or the charge on the capacitor can be changed is by adding or removing electrons. This can only be done through the resistors 20, 21, 22, 16 and tube 26. The time required to charge the capacitor to a predetermined level depends on the time constant. The movement of electrons to charge the capacitor is an electrical current and the movement of such current through resistance produces a voltage drop. This voltage or a portion thereof is then applied to the grid 23. As condenser 19 acquires a charge, the current flowing to it decreases so that the voltage across the resistors is less. If the time constant is of the order of the duration of the positive pulse, or the time during which the plate remains at the higher potential, the voltage across the resistors 20, 21 and 22 will fall approximately 60%. However, the voltage across resistors 21 and 22 is maintained constant during the pulse by means of a voltage regulator which is indicated as a glow tube but may be any other well known device. Assuming, therefore, that the voltage across the resistor combination during the pulse is as indicated in curve A of Fig. 2, it will be seen that the voltage across resistors 21 and 22 is maintained constant as indicated in curve B of Fig. 2.

It is obvious that the same circuit may be used to produce an output voltage of constant amplitude and rectangular shape regardless of the shape of the input pulse so long as its amplitude always exceeds a predetermined minimum.

While there has been described what is at present considered the preferred embodiment of the invention, it is obvious to those skilled in the art that various changes and modifications may be made therein without departing from the invention, and, it is, therefore, aimed in the appended claims to cover all such changes and modifications as fall within the true spirit and scope of the invention.

What is claimed is:

1. A wide band coupling circuit for translating rectangular voltage pulses comprising a capacitor and resistor series combination having a time constant value of the order of the duration of the longest pulse to be translated, means for applying a preformed substantially rectangular voltage pulse across said combination, voltage regulator means connected across a portion of said resistor, the value of said portion being such that in the absence of said regulator means the voltage across said portion during the pulse would always exceed the regulated voltage, and output means connected across said regulator means.

2. The combination as in claim 1 wherein said voltage regulator means comprises a glow tube.

3. A wide band coupling circuit for translating voltage pulses comprising means to preform a substantially rectangular voltage pulse, an amplifier tube having a grid and a plate, means to apply the voltage of said pulse to the grid of said tube, a coupling circuit connected between the plate of said tube and an output circuit to which said pulse is fed, said coupling circuit including a capacitor and a resistor system connected in series therein, voltage regulating means shunted across at least a portion of said resistor system, and a connection from the shunted portion of said resistor to said output circuit.

4. The combination as in claim 3 wherein said voltage regulator is a glow tube.

5. An apparatus for forming and indicating a rectangular voltage pulse comprising means for preforming a substantially rectangular pulse, an amplifier tube having a grid and a plate, a connection from the pulse preforming means to said grid, indicating means, a coupling circuit connected between the plate of said amplifier tube and said indicating means, said circuit including a capacitor and a resistor system connected in series therein, voltage regulator means shunted across at least a portion of said resistor system, the voltage drop of the shunted portion being less than the minimum voltage applied thereto, and a connection from the shunted portion of said resistor system to said indicator means.

6. The combination as in claim 5 wherein the voltage regulator is a glow tube.

References Cited in the file of this patent

UNITED STATES PATENTS

| Number | Name | Date |
|---|---|---|
| 2,438,518 | Piety | Mar. 30, 1948 |
| 2,506,723 | Larsen | May 9, 1950 |
| 2,550,715 | Norton | May 1, 1951 |
| 2,624,770 | Yetter | Jan. 6, 1953 |